US007621702B2

(12) United States Patent
Ende et al.

(10) Patent No.: US 7,621,702 B2
(45) Date of Patent: Nov. 24, 2009

(54) TIMING ELEMENT FOR A LUBRICANT DOSING UNIT, LUBRICANT DOSING UNIT, AND METHOD FOR DOSING A LUBRICANT

(75) Inventors: Wolfgang Ende, Neu Wulmstorf (DE); Harald Schueler, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 691 days.

(21) Appl. No.: 11/246,860

(22) Filed: Oct. 7, 2005

(65) Prior Publication Data
US 2006/0075986 A1    Apr. 13, 2006

Related U.S. Application Data

(60) Provisional application No. 60/616,826, filed on Oct. 7, 2004.

(30) Foreign Application Priority Data

Oct. 7, 2004    (DE) .................. 10 2004 048 950

(51) Int. Cl.
*B23Q 11/10* (2006.01)
(52) U.S. Cl. ................... 408/61; 137/461; 222/334; 222/504; 408/1 R
(58) Field of Classification Search ............. 408/56, 408/61, 1 R; 222/334, 504; 184/29, 7.4, 184/26; 417/383, 384, 387; 137/461, 494; 91/290, 319, 320, 355
See application file for complete search history.

(56) References Cited

U.S. PATENT DOCUMENTS

| 2,733,691 A | * | 2/1956 | Johnson | 60/540 |
| 3,149,537 A | * | 9/1964 | Fink | 91/178 |
| 3,393,705 A | * | 7/1968 | Jaquith | 137/625.6 |
| 3,521,430 A | * | 7/1970 | Vanderlip et al. | 55/283 |
| 3,583,285 A | * | 6/1971 | Johnson | 91/388 |
| 3,584,522 A | * | 6/1971 | Smafield | 408/16 |
| 3,848,809 A | | 11/1974 | Hennequin | |
| 3,874,808 A | * | 4/1975 | Zaccardelli et al. | 408/1 R |
| 4,345,668 A | * | 8/1982 | Gaunt | 184/29 |
| 5,213,454 A | * | 5/1993 | Givler et al. | 408/61 |
| 5,402,913 A | * | 4/1995 | Graf | 222/63 |
| 5,884,713 A | * | 3/1999 | Shinohara et al. | 173/206 |
| 5,890,848 A | * | 4/1999 | Kachich | 408/1 R |
| 6,702,199 B1 | * | 3/2004 | Sugata et al. | 239/128 |

FOREIGN PATENT DOCUMENTS

DE    23 22 425 C    11/1973

* cited by examiner

Primary Examiner—Daniel W Howell
(74) Attorney, Agent, or Firm—Christopher Paradies; Fowler White Boggs P.A.

(57) ABSTRACT

A timing element for a lubricant supply system is capable of using pneumatics for the time of delivery of lubricant for a preset duration. In one example, the timing element has a cavity having an entrance and an exit, a first piston and a second piston. The first piston and the second piston are disposed in the cavity. The first piston is coupled to the second piston in such that compressed air in the entrance of the cavity is capable of moving the second piston and closing the exit. A pneumatic timing element may be incorporated into a dosing unit that is capable of supplying an amount of lubricant in a mist to a plunger bushing of a machine tool without. The duration of the dosing may be controlled solely by pneumatics and may prevent excess pooling of lubricant in bore holes by shutting off lubricant delivery at a preset time.

7 Claims, 2 Drawing Sheets

TIMING ELEMENT FOR A LUBRICANT DOSING UNIT, LUBRICANT DOSING UNIT, AND METHOD FOR DOSING A LUBRICANT

RELATED APPLICATIONS

This application claims the benefit of the filing date of U.S. Provisional Patent Application No. 60/616,826 filed Oct. 7, 2004, and of German Patent Application No. 10 2004 048 950.5 filed Oct. 7, 2004 the disclosures of which are hereby incorporated by reference herein.

FIELD OF THE INVENTION

The field relates to a timing element for a lubricant dosing unit, a lubricant dosing unit, and a method for dosing a lubricant.

BACKGROUND

Machines and drill feed units, particularly for boring metal parts, are known in the related art. Lubricants are frequently used to improve the boring quality, which are typically sprayed onto the tool of the drill feed unit from the outside. The lubricant is typically sprayed for this purpose with the aid of so called minimum quantity dosing systems, using which the quantity of sprayed lubricant may be kept as low as possible.

Furthermore, systems are also known for performing cutting bores, in which the lubricant is not sprayed on from the outside, but rather is dosed by lubricant systems during the cutting procedure to the cutting edges of the tool through bores integrated into the bore spindle and the tool.

In addition, systems in which the lubricant is dosed using lubricant systems and the lubricant is sprayed through bores in a so called plunger bushing of the drill feed unit onto the cutting edges of the tool, for example, are known.

However, spraying the lubricant from the outside and through the tools results in wetting of the components which are bored. This may result in lubricant collecting in depressions of the bore produced, through which reduction or destruction of the adhesion of sealants which were applied in the depressions, before the insertion of rivets, for example, occurs. In bores which are produced using cutting, suction systems which suction out the bore chips arising during the boring are used together with the lubricant systems. However, the suction systems also suck lubricant out of the lubricant supply system after the dosed lubricant supply. Further contamination by the lubricant used of the components which are bored occurs in this way. The components must therefore be cleaned of the lubricant before a sealant application, i.e., before the forming of a seal, in the depressions of the bores produced, and before a fitting rivet mounting. This is performed using complex individual cleaning via cold cleaners such as Rumanol or Skyclean.

There is a longstanding and unresolved need for a simple and reliable lubricant supply and dosing system that does not require a complex cleaning system.

SUMMARY OF THE INVENTION

This need may be met by a timing element for a lubricant dosing unit, a lubricant dosing unit, and a method for dosing a lubricant according to the examples of the present invention described herein.

A timing element for a lubricant supply system has a cavity with an entrance and an exit and a first and second piston. The first and second piston are disposed in the cavity and are coupled such that applying of compressed air to the entrance of the second piston to a position that closes the exit of the lubricant supply system A lubricant dosing unit includes a timing element, a lubricant pump, and a shutoff valve. The exit of the timing element may be coupled to the lubricant pump such that, upon application of compressed air to the entrance of the timing element, the lubricant pump pumps lubricant through the shutoff valve. The exit of the timing element is coupled to the shutoff valve such that the shutoff valve is only opened when the compressed air is applied.

A method for dosing a lubricant during boring uses a boring system which comprises a lubricant dosing unit having a timing element, a lubricant pump, and a shutoff valve. The timing element outputs a compressed air pulse, which may have a predefined time span. The timed compressed air pulses, pumps lubricant from the lubricant pump into the shutoff valve. The shutoff valve may be operated using the compressed air pulse such that the shutoff valve is only in an open state so long as the compressed air pulse is provided by the timing element.

Minimum quantity dosing of lubricant may be possible using a timing element according to the present invention, since lubricant is only provided during a duration of a compressed air pulse of the timing element. In advantage is that empty sucking of supply lines may be prevented, because the shutoff valve is only in an open state during the presence of a compressed air pulse. If no compressed air pulse is provided by the timing element, i.e., if the second piston closes the exit, the shutoff valve may be placed in a closed state and no lubricant may be suctioned out of the supply lines and through the shutoff valve. In other words, the shutoff valve may be blocked in the unpressurized state and may only open upon activation by the compressed air pulse from the timing element. Furthermore, it may be ensured using the lubricant dosing unit that the lubricant dosing is terminated before ending the boring process.

The timing element may be coupled with known lubricant pumps and integrated into a lubricant supply and dosing system. A further advantage of the timing element may be that it may be designed as a purely pneumatic control system. Therefore, no electronic components may be necessary and the pneumatic control system may be designed in an especially simple and cost-effective way. Wetting of the depression of a bore with lubricant may also be avoided using the lubricant dosing unit according to the present invention, by which additional cleaning outlay may be dispensed with In one example, a known lubricant supply system may be coupled with a pneumatic timing element that provides compressed air pulses to the lubricant dosing system. The duration and interval of the pulses may be specified or controlled. For this purpose, the timing element may be designed in such a way that it has two pistons in a cavity, which are connected to one another and, upon application of compressed air to the timing element, i.e., the cavity, may be moved through an entrance of the cavity in such a way that one of the pistons may close an exit of the cavity, by which the compressed air pulse may be ended and the dosing of the lubricant may be ended. Alternatively, the two pistons may also be implemented in one piece, i.e., as a rod on one end of which a first piston body may be implemented, which may form the first piston, and on the other end of which a second piston body may be implemented, which may form a second piston, for example. After ending a boring process, the entrance of the cavity may be unpressurized and the two pistons may be moved back into the starting position, in which the exit of the cavity may be not closed using a piston. Such an lubricant supply system may be accounted for as a minimum quantity lubricant dosage system for the production of fitting rivet bores with machines and drill feed units.

In an exemplary embodiment, the timing element also further comprises a spring which is positioned in the cavity in such a way that the first piston is pressed against the spring upon application of the compressed air.

Providing a spring in the cavity may be a design to implement a purely pneumatic timing element, i.e., control element. Upon application of compressed air to the cavity, the first piston may be pressed against the spring, while the second piston may close the exit of the cavity. If the application of compressed air is then interrupted, the two pistons, which are connected to one another, may be moved back into their starting position by the spring, through which the second piston may open the exit again and a second compressed air pulse may be output by the timing element. As an alternative to a spring, the pistons may also be moved back into the starting position using compressed air.

In another exemplary embodiment a piston cross-section of the first piston is larger than a piston cross-section of the second piston. The cavity may have a first partial cavity and a second partial cavity, wherein the first piston being positioned in the first partial cavity and the second piston may be positioned in the second partial cavity and, in addition, the entrance being positioned in the first partial cavity and the exit being positioned in the second partial cavity. The two partial cavities may also have different sized cross-sections in this case, which may correspond to the cross-sections of the pistons which are positioned in the individual partial cavities.

The design of the two pistons as pistons which have different cross-sections, i.e., in the case of a round cross-sectional area of the pistons, different diameters, may be an effective design to ensure that both pistons are moved upon application of compressed air. Different forces on the two pistons may result through the different cross-sections, i.e., the larger piston may experience a greater force through the compressed air than the piston having the smaller cross-section, through which both pistons move in the direction of the piston which has the larger cross-section.

The timing element may be set up in such a way that a compressed air pulse is applied for a predefinable time span at the exit of the timing element. In particular, the length of the predefinable time span may be settable using a dimension of the cavity and/or a dimension of the spring.

A variation of the cavity and/or the spring may be an especially effective way to vary the time span of the compressed air pulse. The time span of the compressed air pulse may be set by selecting the spring hardness and/or spring length and/or by a length of the cavity, along which length the two pistons move upon application of compressed air. The time span of the compressed air pulse is preferably approximately 0.3 seconds. The time span of the compressed air pulse may be set variably for other applications as a function of the required lubricant quantity. Instead of a spring, other elastically deformable components may also be used as the resetting unit.

In an exemplary embodiment, the lubricant pump comprises an entrance connection and an exit connection. The shutoff valve comprises a first inlet, a second inlet, and an outlet. The entrance connection of the lubricant pump is coupled to the exit of the timing element and the exit connection of the lubricant pump is coupled to the first inlet of the shutoff valve. Furthermore, the exit of the timing element is coupled to the second inlet of the shutoff valve.

Using such a design of the coupling between timing element, lubricant pump, and shutoff valve, it may be possible to ensure easily that during a boring process, no lubricant is suctioned out of supply lines, for example, between the lubricant pump and the shutoff valve. The shutoff valve may be set up in such a way that it may be only opened during the duration of the compressed air pulse, and may be closed when no compressed air pulse is applied.

Furthermore, the lubricant dosing unit may have a plunger bushing, which is coupled to the shutoff valve. The plunger bushing may have a lubricant channel. The lubricant channel preferably may have a first partial section and a second partial section, a diameter of the first partial section being larger than a diameter of the second partial section.

By providing a lubricant channel in the plunger bushing, which lubricant channel has a partial area, i.e., a section, having a first diameter and a second partial area having a second diameter, the first diameter being larger than the second diameter, it may be easily possible to produce a fine lubricant jet and/or a lubricant mist, which may be sprayed onto cutting edges of a boring tool which may be positioned within the plunger bushing. By such a design it may be possible to provide the lubricant in a finely and evenly distributed way during the boring, through which the quality of the bore may be improved further.

In another exemplary embodiment the plunger bushing is coupled to the outlet of the shutoff valve.

A lubricant dosing unit according to the present invention may particularly be used in boring processes in which a high quality of the bore is required, as when boring a component which is used in aerospace engineering. The component may be made of metal, composite materials, or plastic.

In summary, the present invention may provide a lubricant dosing unit for a lubricant supply system, which dosing unit may have a pneumatic timing element, using which minimum quantity dosing may be performed exactly and which may be integrated without problems into existing lubricant supply systems. As an example, the lubricant dosing unit may form a purely pneumatic control system for a lubricant supply unit, in which no electricity or electronic components may be necessary and using which wetting with lubricants of depressions in produced bores may be avoided, whereby the cleaning outlay for bores produced may be reduced. It may be decisive in this case that it may be ensured using the lubricant dosing unit according to the present invention that the lubricant dosing may be terminated before ending the boring process. For this purpose, the pneumatic timing element may be coupled into the supply air flow of the lubricant dosing unit and may cause a lubricant mist to be generated for a predefined, i.e., a definite, time span, for example, 0.3 seconds. Using the timing element according to the present invention and the lubricant dosing unit it may be possible to produce bores of higher quality in an effective way, as may be necessary in components made of metal, composite materials, or plastic, for example, for aerospace engineering.

BRIEF DESCRIPTION OF THE DRAWINGS

An exemplary embodiment of the present invention is illustrated in the figures and will be described in greater detail with reference to the figures.

DETAILED DESCRIPTION OF PREFERRED EMBODIMENTS OF THE INVENTION

Figure 1:
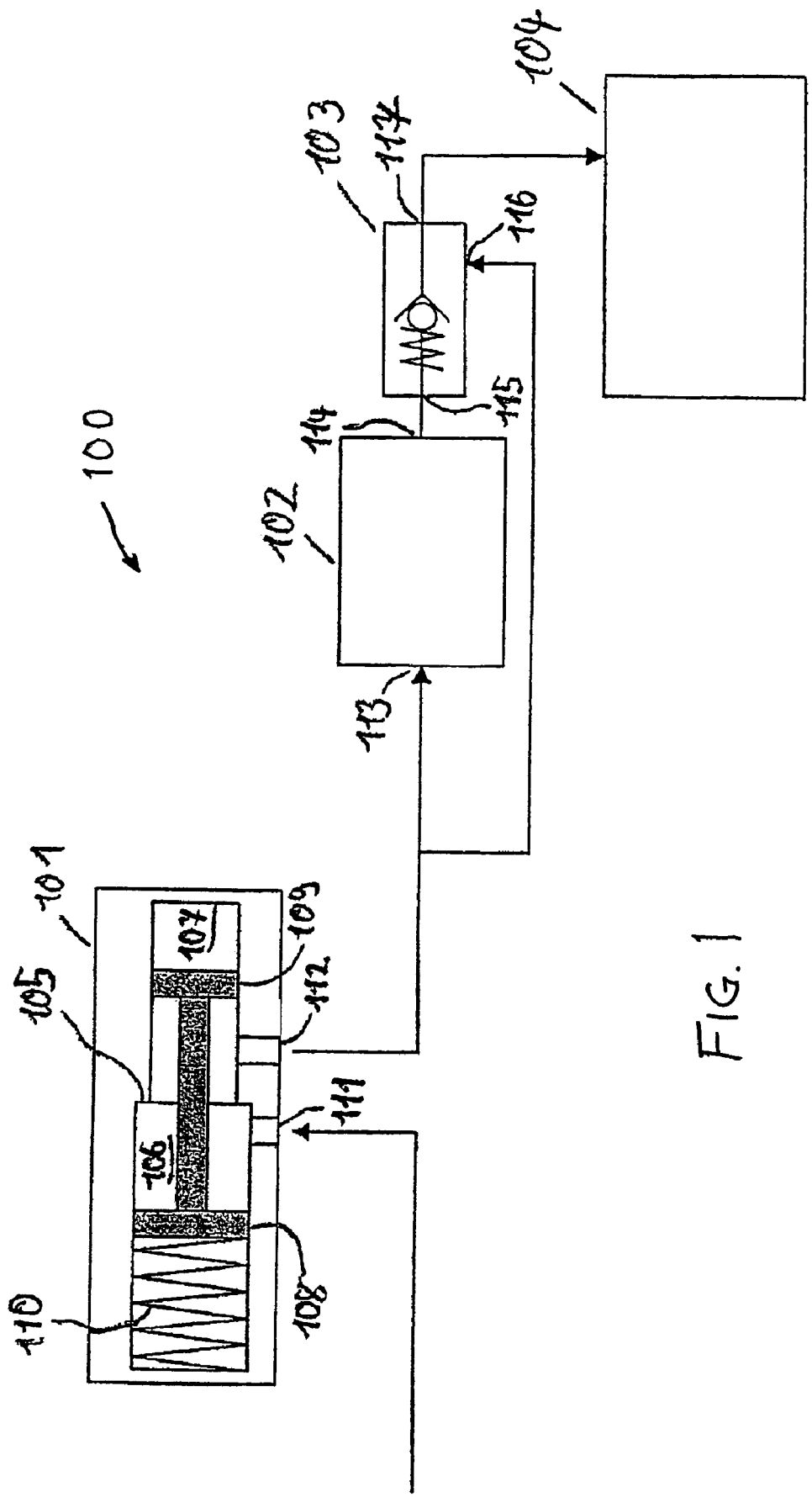
FIG. 1 shows a schematic illustration of a lubricant dosing unit according to the present invention.
Figure 2:
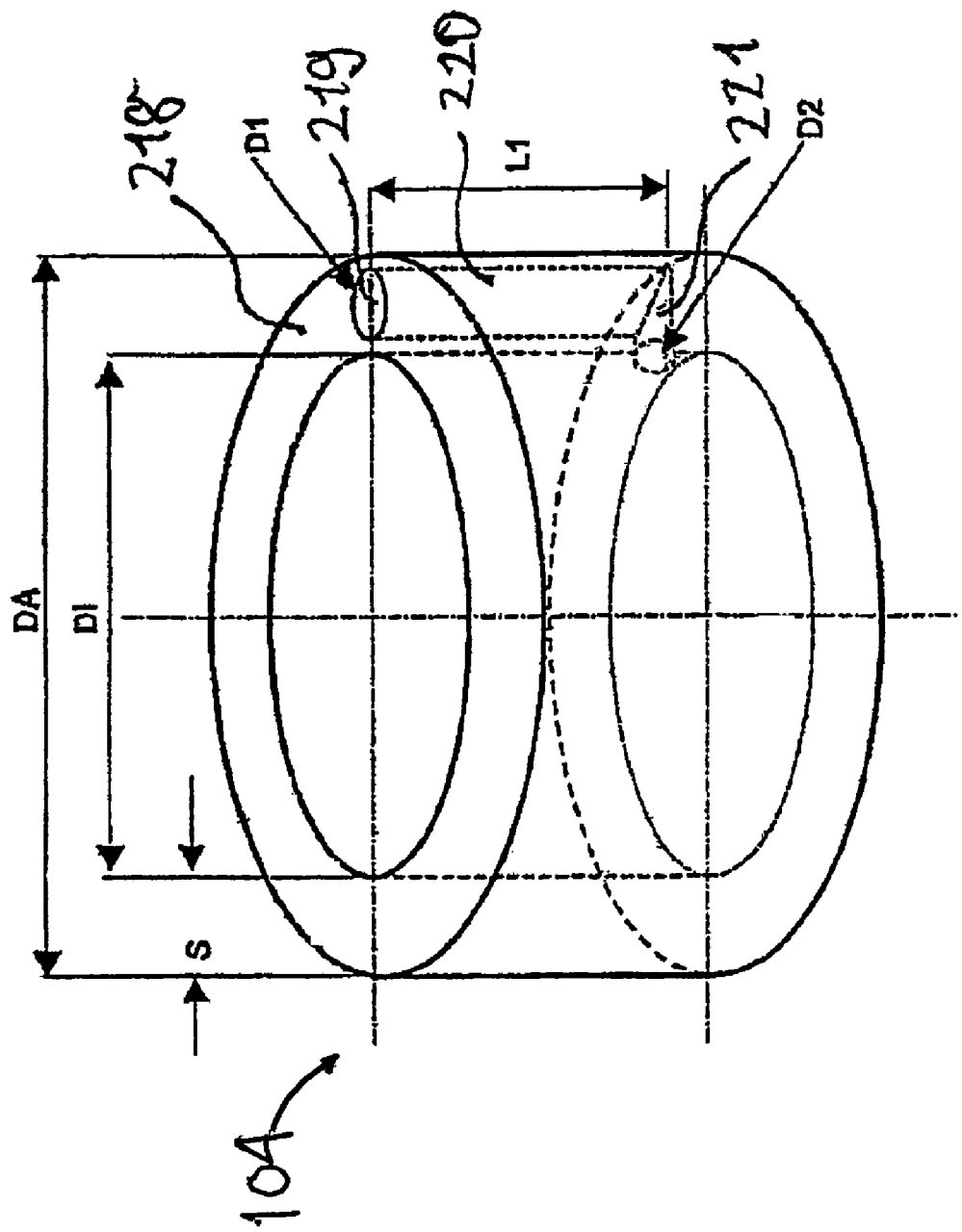
FIG. 2 shows a schematic illustration of a plunger bushing which may be used in a lubricant dosing unit according to the present invention.

FIG. 1 schematically illustrates one example of a lubricant dosing unit 100, which comprises a timing element 101, a lubricant pump 102, a pneumatic shutoff valve 103, and a plunger bushing 104 having a lubricant channel, which plunger bushing is illustrated in more detail in FIG. 2.

The timing element 101 comprises a cavity 105, which comprises a first partial cavity 106 having a round cross-section and a second partial cavity 107 having a round cross-section. A first piston 108 and a second piston 109, which are connected to one another, are positioned within the cavity 105. The first piston 108 has a first diameter, which corresponds to the diameter of the first partial cavity 106, and is positioned inside the first partial cavity 106. The second piston 109 has a second diameter, which corresponds to the diameter of the second partial cavity 107, and is positioned inside the second partial cavity 107. Furthermore, a spring 110 is positioned in the first partial cavity 106.

Furthermore, the timing element 101 has a first entrance 111 and an exit 112, the entrance 111 being implemented in the first partial cavity 106 and the exit 112 being implemented in the second partial cavity 107.

The exit 112 of the timing element 101 is coupled to an entrance connection 113 of the lubricant pump 102. An exit connection 114 of the lubricant pump 102 is coupled to a first inlet 115 of the pneumatic shutoff valve 103.

Furthermore, the exit 112 of the timing element 101 is coupled to a second inlet 116 of the pneumatic shutoff valve 103. An outlet 117 of the pneumatic shutoff valve 103 is coupled to the plunger bushing 104, i.e., to the lubricant channel of the plunger bushing.

In the following, the functional principle of the lubricant dosing unit 100 which is schematically illustrated in FIG. 1 will be described briefly by way of example. In FIG. 1, both pistons are shown in a starting position. If the timing element 101 now has compressed air applied to it by applying compressed air to the entrance 111, compressed air flows through the cavity 105 to the exit 112, through which the beginning of a compressed air pulse is characterized. Simultaneously, the pistons in FIG. 1 move to the left, since a differential force arises on the pistons due to the different piston areas of the first piston 108 and the second piston 109. The first piston 108 is pressed against the spring 110 in this case. Simultaneously, the second piston 109 in FIG. 1 also moves to the left and thus closes the exit 112, through which the compressed air pulse is ended. The dosing of the lubricant is also ended by the ending of the compressed air pulse, since the dosing of the lubricant is performed using the lubricant pump 102, which is coupled to the exit 112 of the timing element 101. After ending the boring process, the entrance 111 of the timing element 101 gets unpressurized, through which the first piston 108 and, with it, also the second piston 109 are moved back into the starting position by the spring 110.

The lubricant dosing unit 100 also comprises the pneumatic shutoff valve 103, which prevents empty sucking of the supply line of the lubricant, i.e., particularly the lubricant line between the lubricant pump 102 and the plunger bushing 104. The pneumatic shutoff valve 103, like the lubricant pump 102, is controlled using the compressed air pulse of the timing element 101. For this purpose, the second inlet 116 of the shutoff valve 103 is coupled to the exit 112 of the timing element 101. The shutoff valve 103 is set up in such a way that it is blocked in the unpressurized state, i.e., when the timing element 101 is not generating a compressed air pulse, and is only opened upon activation of the shutoff valve 103 using the compressed air pulse of the timing element 101. If the shutoff valve 103 is open, the lubricant is conducted from the lubricant pump 102 through the shutoff valve 103 into the lubricant channel of the plunger bushing 104, where it generates a lubricant jet or lubricant mist which is sprayed onto cutting edges of a boring tool.

FIG. 2 shows the plunger bushing 104 in a more detailed view. The plunger bushing 104 has a wall 218, which has an external diameter DA and an internal diameter DI. The thickness S of the wall 218 is identified in FIG. 2. A lubricant channel 219 is implemented within the wall 218. The lubricant channel 219 has a first partial section 220 and a second partial section 221. In this case, the first partial section 220 has a first diameter D1 and the second partial section 221 has a second diameter D2, which is smaller than the first diameter D1. The second partial section 221 is also implemented so that one end adjoins the first partial section 220 and the other end penetrates the wall 219 of the plunger bushing 104 toward the center of the plunger bushing 104. Thus, lubricant is capable of being sprayed toward the center of the plunger bushing 104 through the second partial section 221, whereby cutting edges of a boring tool which is positioned within the plunger bushing 104 may be sprayed with lubricant. In one example, the first diameter D1 is preferably approximately 0.7 mm and the second diameter D2 is preferably between approximately 0.3 mm and 0.5 mm. In addition, the length L1 of the lubricant channel 219 is identified in FIG. 2.

A lubricant dosing unit for a lubricant supply system may have a pneumatic timing element. Minimum quantity dosing may be performed exactly when and where desired by using pneumatic pulses and may be integrated without problems into existing lubricant supply systems. As an example, the lubricant dosing unit may form a purely pneumatic control system for a lubricant supply unit, in which no electricity or electronic components are used to control the supply of lubricants. By coupling the delivery of pneumatic pulses with the depth of bore, undesirable residual wetting of depressions of bores with lubricant may be avoided. Thus, waste and cleaning outlay for produced bores may be reduced. In one example, the pneumatic timing element is coupled into the supply air flow of the lubricant dosing unit and supplies a lubricant mist for only a predefined, finite time span, such as 0.3 seconds.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

What is claimed:

1. A lubricant dosing unit, which comprises:
 a timing element for a lubricant supply system, the timing element comprising a cavity having an entrance and an exit, a first piston and a second piston, wherein the first piston and the second piston are positioned in the cavity and wherein the first piston is coupled to the second piston such that, when compressed air is applied to the entrance of the cavity, the first piston and the second piston move and the second piston closes the exit;
 a lubricant pump; and
 a shutoff valve,
 wherein the exit of the timing element is coupled to the lubricant pump and the shutoff valve such that, when compressed air is applied to the entrance of the cavity of the timing element, the shutoff valve is opened, and the lubricant pump pumps lubricant through the shutoff valve.

2. The lubricant dosing unit of claim 1,
 wherein the lubricant pump comprises:
 an entrance connection,
 and an exit connection,
 wherein the shutoff valve comprises:
 a first inlet,
 a second inlet, and
 an outlet
 wherein the entrance connection of the lubricant pump being coupled to the exit of the timing element,
 wherein the exit connection of the lubricant pump being coupled to the first inlet of the shutoff valve, and wherein the exit of the timing element further being coupled to the second inlet of the shutoff valve.

3. The lubricant dosing unit of claim 1, which further comprises:

a plunger bushing wherein is the plunger bushing is coupled to the outlet of the shutoff valve.

4. The lubricant dosing unit of claim 3, wherein the plunger bushing comprises a lubricant channel.

5. The lubricant dosing unit of claim 4, wherein the lubricant channel comprises:

a first partial section, and a second partial section, wherein a diameter of the first partial section being larger than a diameter of the second partial section.

6. The lubricant dosing unit of claim 3, wherein the plunger bushing is coupled to the outlet of the shutoff valve.

7. A method comprising:

boring an aerospace engineering component; and dosing a lubricant using a lubricant dosing unit according to claim 1 during the step of boring.

* * * * *